(12) United States Patent
Fujiwara

(10) Patent No.: US 10,283,743 B2
(45) Date of Patent: May 7, 2019

(54) BATTERY MODULE

(71) Applicant: TOYOTA JIDOSHA KABUSHIKI KAISHA, Toyota-shi, Aichi-ken (JP)

(72) Inventor: Nobuyoshi Fujiwara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 260 days.

(21) Appl. No.: 15/119,899

(22) PCT Filed: Feb. 17, 2015

(86) PCT No.: PCT/IB2015/000172
§ 371 (c)(1),
(2) Date: Aug. 18, 2016

(87) PCT Pub. No.: WO2015/124989
PCT Pub. Date: Aug. 27, 2015

(65) Prior Publication Data
US 2017/0229689 A1  Aug. 10, 2017

(30) Foreign Application Priority Data
Feb. 20, 2014 (JP) .................. 2014-031081

(51) Int. Cl.
*B60K 1/04* (2019.01)
*B60L 3/00* (2019.01)
(Continued)

(52) U.S. Cl.
CPC ......... *H01M 2/1077* (2013.01); *B60L 3/0007* (2013.01); *B60L 3/0046* (2013.01);
(Continued)

(58) Field of Classification Search
CPC .............. H01M 2/1077; H01M 2/206; H01M 2200/00; B60L 3/0007; B60L 3/0046;
(Continued)

(56) References Cited

U.S. PATENT DOCUMENTS

2012/0100399 A1* 4/2012 Adachi ................. B60L 11/18
429/7
2012/0164490 A1 6/2012 Itoi et al.
2016/0315299 A1* 10/2016 Kishii ................ H01M 2/1077

FOREIGN PATENT DOCUMENTS

| CN | 101641251 A | 2/2010 |
| CN | 102456908 A | 5/2012 |

(Continued)

*Primary Examiner* — Eugenia Wang
(74) *Attorney, Agent, or Firm* — Sughrue Mion, PLLC

(57) ABSTRACT

A battery module provided in a vehicle, includes a holder plate. The holder plate includes openings, a first end surface, a second end surface, support portions and a vulnerable portion. The openings are configured such that cells are inserted in the openings respectively. The first end surface is configured to receive a collision load of a collision object to collide from a third direction. The second end surface is placed on an opposite side to the first end surface in the third direction of the holder plate. The holder plate is supported by the support portions so as to define a space between the second end surface and an adjacent member in the third direction. The vulnerable portion is configured to break the holder plate along a boundary between a first battery group and a second battery group when the vulnerable portion receives the collision load.

5 Claims, 7 Drawing Sheets

(51) Int. Cl.
  *H01M 2/10* (2006.01)
  *H01M 2/20* (2006.01)
  *B60L 11/18* (2006.01)

(52) U.S. Cl.
  CPC ......... *B60L 11/1879* (2013.01); *H01M 2/206* (2013.01); *B60K 1/04* (2013.01); *B60Y 2306/01* (2013.01); *H01M 2200/00* (2013.01); *H01M 2220/20* (2013.01); *Y02T 10/7005* (2013.01); *Y02T 10/705* (2013.01)

(58) Field of Classification Search
  CPC ............... B60L 11/1879; Y02T 10/705; Y02T 10/7005; B60K 1/04; B60Y 2306/01
  See application file for complete search history.

(56) References Cited

FOREIGN PATENT DOCUMENTS

| | | |
|---|---|---|
| JP | 09-284901 A | 10/1997 |
| JP | 2003-045392 A | 2/2003 |
| JP | 2011-065906 A | 3/2011 |
| JP | 2011-510433 A | 3/2011 |
| WO | 2009/079965 A1 | 7/2009 |

\* cited by examiner

PRIOR ART

BATTERY MODULE

INCORPORATION BY REFERENCE

The disclosure of Japanese Patent Application No. 2014-031081 filed on Feb. 20, 2014 including the specification, drawings and abstract is incorporated herein by reference in its entirety.

BACKGROUND OF THE INVENTION

1. Field of the Invention

The present invention relates to a technique to protect a plurality of cells included in a battery module, at the time of a vehicle collision.

2. Description of Related Art

A hybrid vehicle and an electric vehicle are provided with a battery module for accumulating electric power to be supplied to a vehicle drive motor. The battery module is provided with a protection structure for protecting a battery from an impact at the time of a vehicle collision. Japanese Patent Application Publication No. 2003-45392 (JP 2003-45392 A) describes a holder configured to radially sandwich and hold a plurality of cylindrical cells of which electrode terminals are placed on the same plane.

However, when the holder is fixed in a state where one side surface of the holder entirely makes contact with a wall surface of a vehicle structure, the cylindrical batteries might be deformed at the time of a vehicle collision. This point will be described below with reference to FIG. 7. FIG. 7 is a schematic sectional view of a battery module, and illustrates a behavior of the battery module at the time of a vehicle collision. Note that an arrow F indicates a direction where a load is applied.

When a load F is applied to a holder 201, the holder 201 is pushed toward a wall surface P. Since no gap is formed between the holder 201 and the wall surface P, the holder 201 is crushed by the load F and an excessive compressive load may be applied to cells 202. Further, if the holder 201 breaks due to the load F right above the cell 202, a protruding portion formed in a broken part may make point contact with the cell 202. This may cause an excessive compressive to be applied to the cell 202.

SUMMARY OF THE INVENTION

The present invention relates to a battery module provided in a vehicle. The battery module includes a battery set, first bus bars, second bus bars, a holder plate. The battery set includes a plurality of cells. The cells are extending in a first direction, and each cell includes electrode terminals on both end parts of the cell. Positive terminals of the cells are placed in the same plane perpendicular to the first direction. The battery set includes at least a first battery group and a second battery, group, and the first battery group is adjacent to the second battery group in a second direction perpendicular to the first direction. The first bus bars are provided in pair. The first bus bars are configured to connect, in parallel to each other, electrode terminals of a plurality of cells included in the first battery group. The second bus bars are provided in pair. The second bus bars are configured to connect, in parallel to each other, electrode terminals of a plurality of cells included in the second battery group. The holder plate includes openings, a first end surface, a second end surface, support portions and a vulnerable portion. The openings are configured such that the cells are inserted in the openings respectively. The first end surface is configured to receive a collision load of a collision object to collide from a third direction perpendicular to the first and second directions. The second end surface is placed on an opposite side to the first end surface in the third direction of the holder plate. The support portions are provided on both end parts of the holder plate in the second direction. The support portions are configured to support the holder plate. The holder plate is supported so as to define a space between the second end surface and an adjacent member in the third direction. The vulnerable portion is configured to break the holder plate along a boundary between the first battery group and the second battery group when the vulnerable portion receives the collision load.

According to the present invention, the support portions support both end parts of the holder plate in the second direction, so as to form a space at a position adjacent to the second end surface in the third direction, thereby making it possible to restrain a load in a collision from concentrating on the vicinity of a load point. This accordingly disperses the load to be applied to the holder plate, thereby making it possible to prevent the holder plate from being crushed and an excessive load from being applied to the cell. According to the present invention, the vulnerable portion configured to break the holder plate along the boundary between the first and second battery groups when the vulnerable portion receives a collision load is provided. As a result, it is possible to prevent a protruding portion formed at the time of breakage of the holder plate from making point contact with the cell, and to prevent an excessive load from being applied to the cell. Further, a part not restrained by the first and second bus bars serves as a breakage part of the holder plate, so that the holder plate is easy to break at the time of a vehicle collision.

The vulnerable portion may include a first groove and a second groove. The first groove is provided on the first end surface at a position corresponding to the boundary between the first battery group and the second battery group. The second groove is provided on the second end surface at a position corresponding to the boundary between the first battery group and the second battery group.

The first groove may include a first inclined surface. The first inclined surface is inclined relative to the third direction and extends toward a first intermediate line. The first intermediate line is a line extending in the third direction so as to pass through an intermediate position between a first cell and a second cell in the second direction. The first cell is a cell placed at a position closest to the first groove among the plurality of cells included in the first battery group. The second cell is a cell placed at a position closest to the first groove among the plurality of cells included in the second battery group. The second groove includes a second inclined surface. The second inclined surface is inclined relative to the third direction and extends toward a second intermediate line. The second intermediate line is a line extending in the third direction so as to pass through an intermediate position between a third cell and a fourth cell in the second direction. The third cell is a cell placed at a position closest to the second groove among the plurality of cells included in the first battery group. The fourth cell is a cell placed at a position closest to the second groove among the plurality of cells included in the second battery group. According to the above configuration, since a second moment of area on the intermediate line of the holder plate is decreased, the holder plate is easy to break at an intermediate position between adjacent cells.

The first battery group and the second battery group may each configured such that cell rows are aligned in the third direction. The cell row is a group in which a plurality of cells is aligned in the second direction. The first end surface includes a plurality of curved surfaces projecting toward a direction opposite to the third direction. A cell center may placed on a first line. The first line is a line extending in the third direction so as to pass through a vertex of each of the curved surfaces. The cell center is a center of each fifth cell viewed in the first direction. The fifth cells are cells of the cell row placed at a position closest to the first end surface among the first battery group and the second battery group. According to this configuration, the collision object having a collision with the curved surface moves in a sliding manner along the curved surface, so that a load point can be separated from a center line of the cell extending in the third direction so as to pass through the cell center. Hereby, it is possible to prevent an excessive load from being applied to the cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
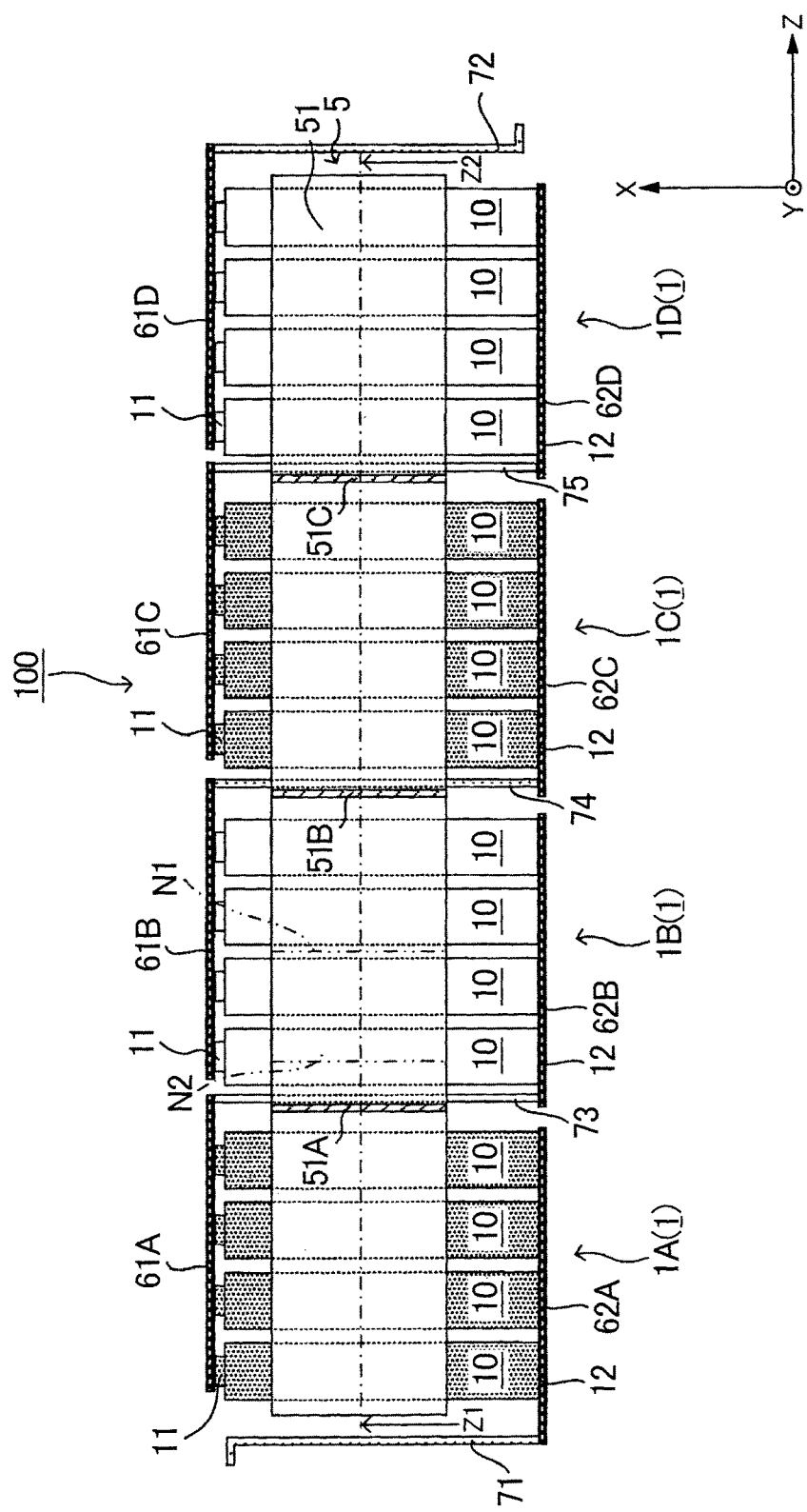
FIG. 1 is a schematic view of a battery module.
Figure 2:
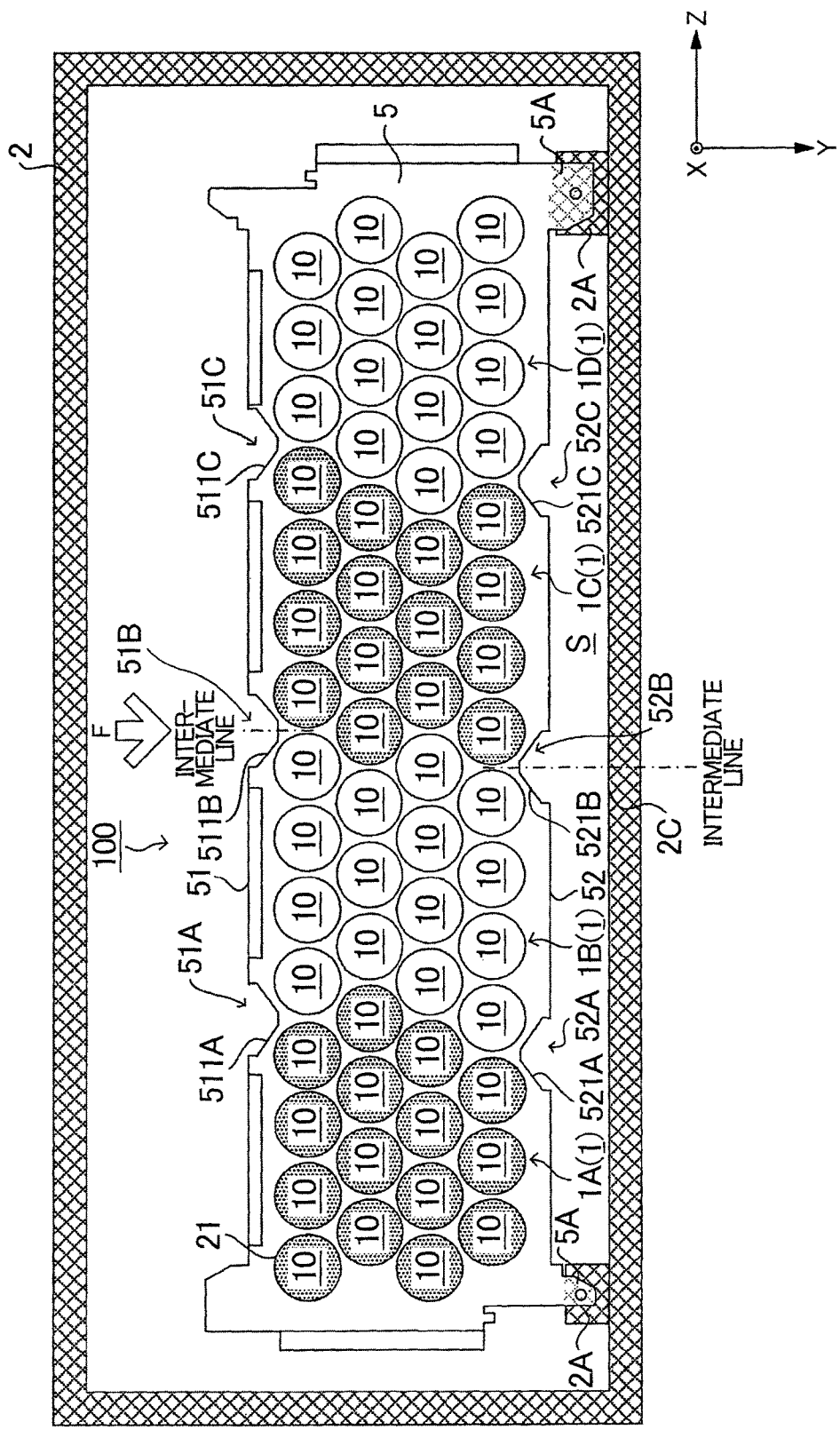
FIG. 2 is a sectional view of the battery module taken along a line Z1-Z2.
Figure 3:
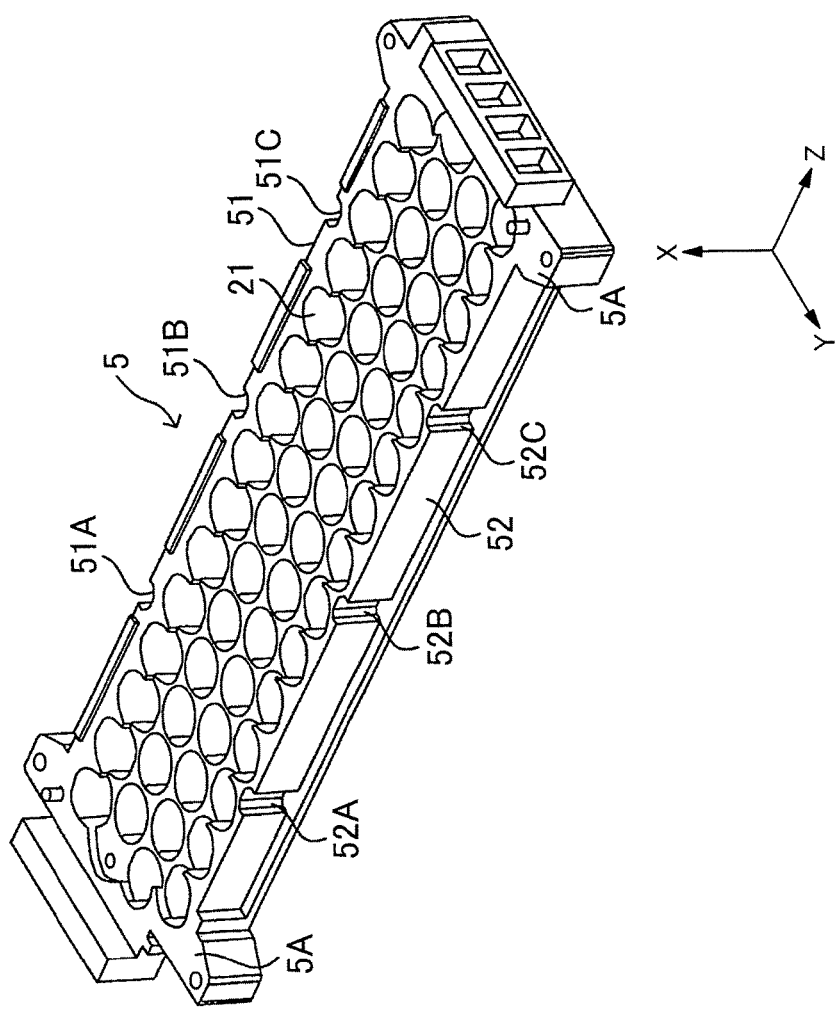
FIG. 3 is a perspective view of a holder plate.

A battery module of one embodiment of the present invention is described below with reference to the drawings. FIG. 1 is a schematic view of the battery module. FIG. 2 is a sectional view of the battery module taken along a line Z1-Z2. FIG. 3 is a perspective view of a holder plate. An X-axis, a Y-axis, and a Z-axis are three axes perpendicular to each other. An X-axis direction (an example of a first direction) is a vehicle-height direction, a Y-axis direction (an example of a third direction) is a vehicle traveling direction, and a Z-axis direction (an example of a second direction) is a vehicle width direction. The battery module is used as an in-vehicle battery configured to accumulate electric power to be supplied to a vehicle drive motor, and can be provided in a luggage room of a vehicle, for example.

With reference to these figures, the battery module 100 includes a battery set 1 in which a plurality of cells 10 is arranged in a matrix shape, is accommodated in a module case 2. The module case 2 is constituted by an upper case and a lower case, and FIG. 2 illustrates a section of the lower case. The lower case can be fixed to a fixed portion (e.g., a floor panel of the luggage room) of the vehicle. The cell 10 is a cylindrical battery configured such that a power generation element is accommodated in a cylindrical case extending in the X-axis direction. As the cell 10, a secondary battery such as a nickel metal hydride battery or a lithium-ion battery can be used. Further, instead of the secondary battery, an electric double layer capacitor can be used.

A positive terminal 11 is formed in one end part of the cell 10 in the X-axis direction, and a negative terminal 12 is formed in the other end part thereof in the X-axis direction. Respective positive terminals 11 of the cells 10 are placed on the same plane including a Y-Z plane. Respective negative terminals 12 of the cells 10 are placed on the same plane including the Y-Z plane.

The battery set 1 is constituted by four different battery groups 1A to 1D. The battery groups 1A and 1B are placed at positions adjacent to each other in the Z-axis direction. The battery groups 1B and 1C are placed at positions adjacent to each other in the Z-axis direction. The battery groups 1C and 1D are placed at positions adjacent to each other in the Z-axis direction. The number of battery groups can be increased or decreased appropriately depending on an output required for the battery module 100. Note that, in FIGS. 1 and 2, the cells 10 included in the battery groups 1A and 1C are shown with hatching, so as to make it easy to distinguish the battery groups from each other.

Each of the battery groups 1A to 1D includes a plurality of cells 10. A positive bus bar 61A is formed in a flat shape extending in a plane including the Y-Z plane, and is connected to the positive terminals 11 of the cells 10 included in the battery group 1A. A negative bus bar 62A is formed in a flat shape extending in a plane including the Y-Z plane, and is connected to the negative terminals 12 of the cells 10 included in the battery group 1A. That is, the plurality of cells 10 included in the battery group 1A is connected in parallel to each other by the bus bars 61A, 62A thus provided in pair, so as to be unitized. A collective negative terminal 71 is further connected to the negative bus bar 62A.

A positive bus bar 61B is formed in a flat shape extending in a plane including the Y-Z plane, and is connected to the positive terminals 11 of the cells 10 included in the battery group 1B. A negative bus bar 62B is formed in a flat shape extending in a plane including the Y-Z plane, and is connected to the negative terminals 12 of the cells 10 included in the battery group 1B. That is, the plurality of cells 10 included in the battery group 1B is connected in parallel to each other by the bus bars 61B, 62B thus provided in pair, so as to be unitized. The positive bus bar 61A of the battery group 1A is connected to the negative bus bar 62B of the battery group 1B via a connection bus bar 73. Note that, when the battery group 1A is assumed a first battery group and the battery group 1B is assumed a second battery group, first bus bars are constituted by the bus bars 61A, 62A, and second bus bars are constituted by the bus bars 61B, 62B.

A positive bus bar 61C is formed in a flat shape extending in a plane including the Y-Z plane, and is connected to the positive terminals 11 of the cells 10 included in the battery group 1C. A negative bus bar 62C is formed in a flat shape extending in a plane including the Y-Z plane, and is connected to the negative terminals 12 of the cells 10 included in the battery group 1C. That is, the plurality of cells 10 included in the battery group 1C is connected in parallel to each other by the bus bars 61C, 62C thus provided in pair, so as to be unitized. The positive bus bar 61B of the battery group 1B is connected to the negative bus bar 62C of the battery group 1C via a connection bus bar 74. Note that, when the battery group 1B is assumed the first battery group and the battery group 1C is assumed the second battery group, the first bus bars are constituted by the bus bars 61B, 62B, and the second bus bars are constituted by the bus bars 61C, 62C.

A positive bus bar 61D is formed in a flat shape extending in a plane including the Y-Z plane, and is connected to the positive terminals 11 of the cells 10 included in the battery group 1D. A negative bus bar 62D is formed in a flat shape extending in a plane including the Y-Z plane, and is connected to the negative terminals 12 of the cells 10 included in the battery group 1D. That is, the plurality of cells 10 included in the battery group 1D is connected in parallel to each other by the bus bars 61D, 62D thus provided in pair, so as to be unitized. The positive bus bar 61C of the battery group 1C is connected to the negative bus bar 62D of the battery group 1D via a connection bus bar 75. A collective positive terminal 72 is connected to the positive bus bar 61D of the battery group 1D. Note that, when the battery group 1C is assumed the first battery group and the battery group 1D is assumed the second battery group, the first bus bar is constituted by the bus bars 61C, 62C, and the second bus bar is constituted by the bus bars 61D, 62D.

A holder plate 5 is formed in a plate shape, and has an opening 21 into which each of the cells 10 is inserted. The opening 21 is formed in a shape (round shape, more specifically) along an outer peripheral surface of the cell 10, and the same number of openings 21 as the cells 10 is provided. However, it is not necessary to provide the same number of openings 21 of the holder plate 5 as the cells 10. For example, some of the openings 21 may be provided as an opening that does not hold the cell 10, and used as a space for passing the connection bus bars 73 to 75 therethrough. Further, the openings that hold the cells 10 radially adjacent to each other may be connected, so as to be used as one opening 21.

The holder plate 5 can be made of a material, such as aluminum alloy, having an excellent thermal conductivity, for example. Hereby, heat generated from the cells 10 at the time of charging and discharging is transmitted to the holder plate 5, thereby making it possible to restrain a temperature variation between the cells 10. An insulating layer is formed between the opening 21 of the holder plate 5 and the cell 10. As the insulating layer, epoxy resin can be used, for example.

A first end surface 51 is formed in an end part of the holder plate 5 in a Y-axis positive direction, and a second end surface 52 is formed in an end part thereof in a Y-axis negative direction. Paired leg portions 5A (corresponding to support portions) are formed at both ends of the second end surface 52 of the holder plate 5 in the Z-axis direction. Paired flange portions 2A are formed on an inner surface 2C of a module case 2. The leg portions 5A are laminated on the flange portions 2A in the X-axis direction, and connected thereto by use of a fastening member, so that the battery module 100 can be fixed to the inner surface 2C of the module case 2. That is, the holder plate 5 is supported by a both-ends-supported-beam structure, and a space S is formed between the second end surface 52 of the holder plate 5 and the inner surface 2C of the module case 2. In this case, an adjacent member is the inner surface 2C of the module case 2.

Referring to FIGS. 2 and 3, first grooves 51A, 51B, 51C as vulnerable portions are formed on the first end surface 51 of the holder plate 5. The first groove 51A is formed at a position corresponding to a boundary between the battery groups 1A and 1B, and extends in the X-axis direction. The first groove 51B is formed at a position corresponding to a boundary between the battery groups 1B and 1C, and extends in the X-axis direction. The first groove 51C is formed at a position corresponding to a boundary between the battery groups 1C and 1D, and extends in the X-axis direction.

Second grooves 52A, 52B, 52C as vulnerable portions are formed on the second end surface 52 of the holder plate 5. The second groove 52A is formed at a position corresponding to the boundary between the battery groups 1A and 1B, and extends in the X-axis direction. The second groove 52B is formed at a position corresponding to the boundary between the battery groups 1B and 1C, and extends in the X-axis direction. The second groove 52C is formed at a position corresponding to the boundary between the battery groups 1C and 1D, and extends in the X-axis direction.

Figure 4:
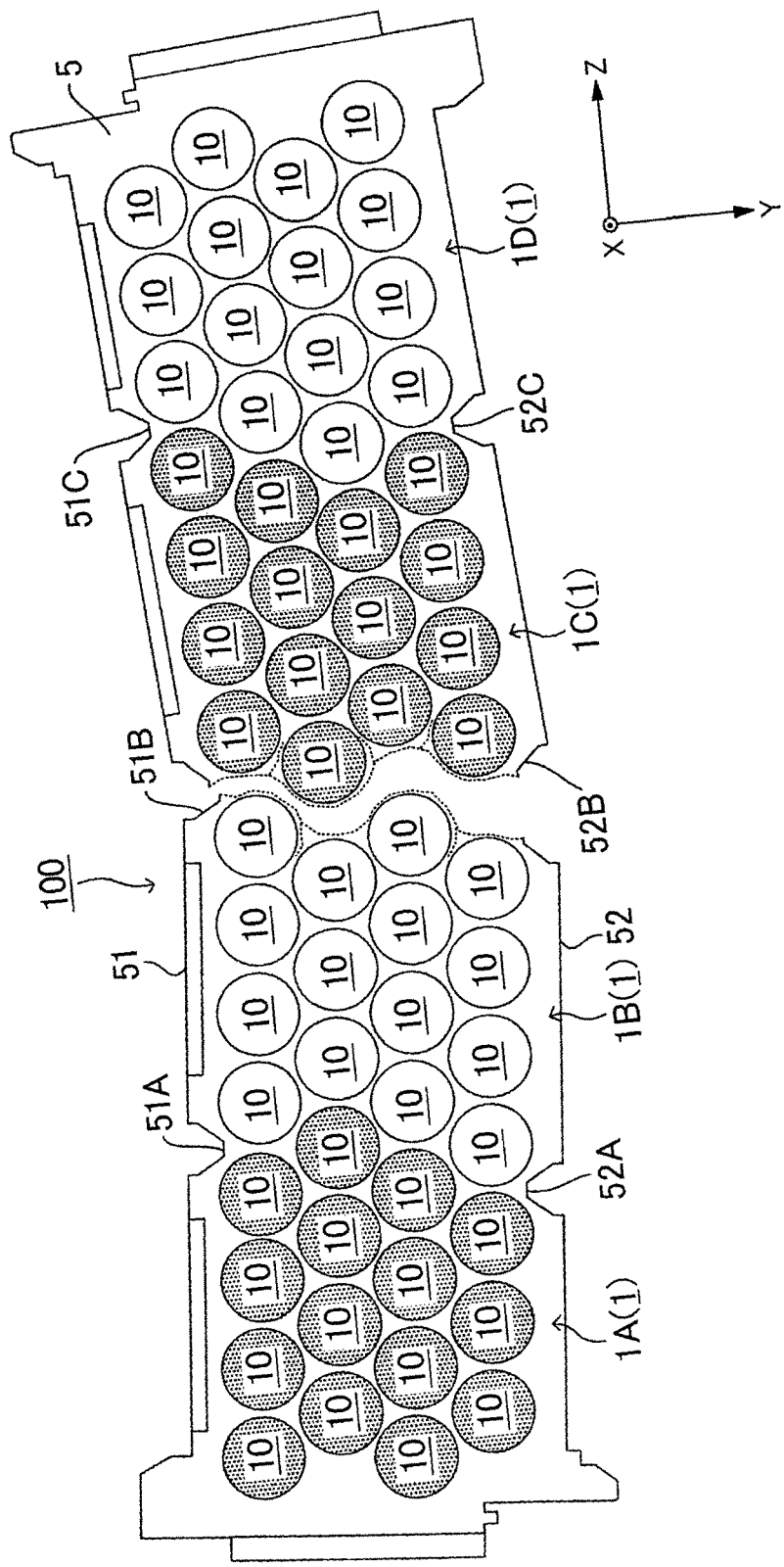
FIG. 4 is a sectional view illustrating the holder plate after the holder plate is broken.

Referring now to FIGS. 2 and 4, the following describes a behavior of the battery module at the time of a vehicle collision. FIG. 4 corresponds to FIG. 2, and illustrates a state after the holder has broken. Note that the module case 2 is not illustrated in FIG. 4. The present embodiment assumes a collision from a vehicle rear side (a so-called rear collision). Referring now to FIG. 2, when a load F is applied, to the first end surface 51 of the holder plate 5, the holder plate 5 is pushed toward the space S. Since the holder plate 5 is supported by the both-ends-supported-beam structure, a moment with the leg portions 5A as fulcrums works, so that the holder plate 5 is bent toward the space S.

Here, die cast metal (that is, aluminum alloy) used for the holder plate 5 has a small elongation percentage relative to the pressure application. As a result, before the second end surface 52 of the holder plate 5 thus bent abuts with the inner surface 2C of the module case 2, a crack occurs in the second groove 52B due to a tensile stress working in the Z-axis direction. When the load F is further applied thereto, the crack develops toward the first groove 51B from the second groove 52B, so that the holder plate 5 breaks along the boundary between the battery group 1B and the battery group 1C.

Here, for example, in a case where the second end surface 52 of the holder plate 5 is entirely supported by the inner surface 2C of the module case 2, a pressing force is concentrated right under the load F, so that the holder plate 5 is crushed, and an excessive load is applied to the cells 10. According to the configuration of the present embodiment, since the holder plate 5 is supported by the both-ends-supported-beam structure, the moment works on the whole holder plate 5, thereby making it possible to disperse the load F.

Next will be described a reason why the groove is formed at a position corresponding to a boundary between battery groups adjacent to each other. As a comparative example, such a configuration is considered that a groove is formed at a position indicated by an alternate long and two short dashes line N1 in FIG. 1, that is, a position corresponding to an inside of the battery group 1B. However, the plurality of cells 10 included in the battery group 1B is unitized by the paired bus bars 61B, 62B. Therefore, in order to break the holder plate 5 at this position, it is necessary to break the connection of the bus bars 61B, 62B with the cells 10. When a load F is further applied in a state where the bus bars 61B, 62B are connected to the cells 10, the cells 10 included in the battery group 1B are pressed by the holder plate 5, so that an excessive load is applied to the cells 10. Further, a crack caused in the second groove 52B may partially develop toward the cell 10, so that a protruding portion formed in a broken part may make point contact with the cell 10. This may cause an excessive load to be applied to the cell 10.

In the present embodiment, the groove is formed at a position corresponding to a boundary between battery groups adjacent to each other, and a region (that is, a region not restrained by the bus bars 61A to 62D) that avoids the unitized battery groups is regarded as a breaking expected part. This makes it possible to break the holder plate 5 while preventing overload to the cells 10.

Further, as another comparative example, such a configuration is considered that a groove is formed at a position indicated by an alternate long and two short dashes line N2 in FIG. 1, that is, a position aligned with the cell 10 in the Y-axis direction. However, in this configuration, a crack may develop from the groove toward the cell 10, so that a protruding portion formed in a broken part may make point contact with the cells 10. This may cause an excessive load to be applied to the cell 10. In the present embodiment, since the groove is formed at the position corresponding to the boundary between the battery groups adjacent to each other, it is possible to break the holder plate 5 in a route that does not pass through the cell 10.

Note that, when a load F is applied to the vicinity of the first groove 51A, a crack develops between the first groove 51A and the second groove 52A, so that the holder plate 5 can break along the boundary between the battery group 1A and the battery group 1B. When a load F is applied to the vicinity of the first groove 51C, a crack develops between the first groove 51C and the second groove 52C, so that the holder plate 5 can break along the boundary between the battery group 1C and the battery group 1D.

Here, a first inclined surface 511B that is inclined relative to the Y-axis direction can be formed in the first groove 51B. The first inclined surface 511B extends toward an intermediate line extending in the Y-axis direction so as to pass through an intermediate position between a cell 10 placed at a position closest to the first groove 51B among the plurality of cells 10 included in the battery group 1B and a cell 10 placed at a position closest to the first groove 51B among the plurality of cells 10 included in the battery group 1C. The first inclined surface 511B can be formed in a symmetrical manner across the intermediate line. In the present embodiment, the first inclined surface 511B is a flat surface, but may be a curved surface. The first grooves 51A, 51C have the same shape as the first groove 51B, so descriptions thereof are not repeated herein.

A second inclined surface 521B that is inclined relative to the Y-axis direction can be formed in the second groove 52B. The second inclined surface 521B extends toward an intermediate line extending in the Y-axis direction so as to pass through an intermediate position between a cell 10 placed at a position closest to the second groove 52B among the plurality of cells 10 included in the battery group 1B and a cell 10 placed at a position closest to the second groove 52B among the plurality of cells 10 included in the battery group 1C. The second inclined surface 521B can be formed in a symmetrical manner across the intermediate line. In the present embodiment, the second inclined surface 521B is a flat surface, but may be a curved surface. The second grooves 52A, 52C have the same shape as the second groove 52B, so descriptions thereof are not repeated herein.

According to the above configuration, since a second moment of area on the intermediate line of the holder plate 5 is decreased, the holder plate 5 is easy to break at an intermediate position between adjacent cells 10. Hereby, a crack caused at the time of the breakage is hard to develop by the cells 10. Further, when a load F is applied to the first inclined surface 511B, a collision object can be moved in a sliding manner in a direction approaching the intermediate line along the first inclined surface 511B. Hereby, it is possible to shift a load point onto the intermediate line with a small second moment of area.

Figure 5:
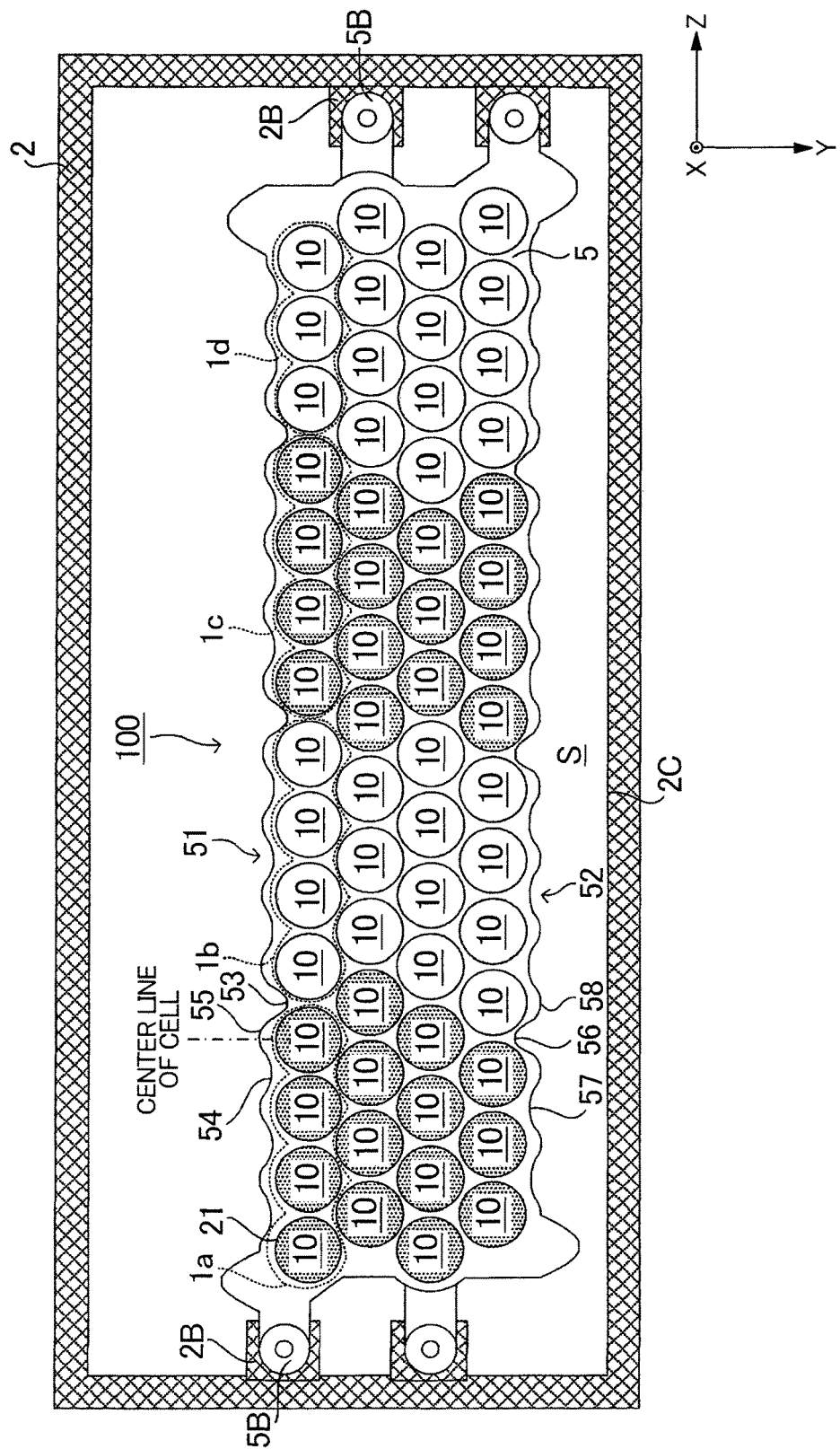
FIG. 5 is a sectional view of a holder plate.

In the above embodiment, the leg portions 5A are formed on the second end surface 52 of the holder plate 5. However, the leg portions may be formed at other positions provided that the holder plate 5 can be supported by the both-ends-supported-beam structure. FIG. 5 is a sectional view to describe leg portions of a modification, and corresponds to FIG. 2. Leg portions 5B are formed on end surfaces of a holder plate 5 in the Z-axis direction. Flange portions 2B are formed on an inner surface of a module case 2 in the Z-axis direction. By connecting the leg portions 5B to the flange portions 2B by a fastening member, a battery module 100 is supported by a both-ends-supported-beam structure. According to a configuration of the modification, it is possible to obtain the same effect as the above embodiment.

Further, FIG. 5 illustrates a modification of the groove. Here, a plurality of cells 10 aligned in the Z-axis direction in a battery group 1A is referred to as a cell row 1a, a plurality of cells 10 aligned in the Z-axis direction in a battery group 1B is referred to as a cell row 1b, a plurality of cells 10 aligned in the Z-axis direction in a battery group 1C is referred to as a cell row 1c, and a plurality of cells 10 aligned in the Z-axis direction in a battery group 1D is referred to as a cell row 1d.

A large groove 53 (corresponding to a first groove), a small groove 54, and a continuous portion 55 are each constituted by a curved surface on a first end surface 51. The large groove 53 and the small groove 54 are formed so as to project in the Y-axis direction, and the continuous portion 55 is formed so as to project toward an opposite side to the large groove 53 and the small groove 54 in the Y-axis direction. Note that the continuous portion 55 corresponds to the curved surface described in Claims. The large groove 53 is formed at a position corresponding to a boundary between adjacent battery groups. The small groove 54 is formed at a position corresponding to a boundary between cells 10 adjacent in the Z-axis direction in the same battery group. The large groove 53 is formed such that its depth in the Y-axis direction is larger than that of the small groove 54. By forming the large groove 53 to have a depth larger than that of the small groove 54, it is possible to break the holder plate 5 along the boundary between the adjacent battery groups with the large groove 53 as a starting point of breaking.

The continuous portion 55 is formed at a position where the continuous portion 55 connects the large groove 53 (or the small groove 52) and the small groove 52 adjacent to each other in the Z-axis direction. Here, a vertex of a curved surface of each continuous portion 55 is placed on a center line of the cell extending in the Y-axis direction so as to pass through a center of each cell 10 included in each of the cell rows 1a to 1d placed near the first end surface 51. The cell center indicates a center of the cell 10 when viewed from the X-axis direction, that is, a radial center of the cell 10.

According to the above configuration, a collision object that collides with the vertex of the curved surface of the continuous portion 55 can be slid toward a top of a curved surface of the large groove 53 (the small groove 54). Hereby, an effective load center of a collision load can be shifted to a position that avoids the cell 10 in the Y-axis direction. As a result, it possible to prevent a protruding portion formed at the time of breakage from making point contact with the cell 10 and to prevent an excessive load from being applied to the cell 10. Further, since the continuous portion 55 is constituted by a curved surface, a heat-dissipation area of the holder plate 5 is increased, thereby making it possible to restrain deterioration of the cells 10. Note that a large groove 56, a small groove 57, and a continuous portion 58 formed on the second end surface 52 have the same shapes as the large groove 53, the small groove 54, and the continuous portion 55 formed on the first end surface 51, respectively, so descriptions thereof are not repeated.

Figure 6:
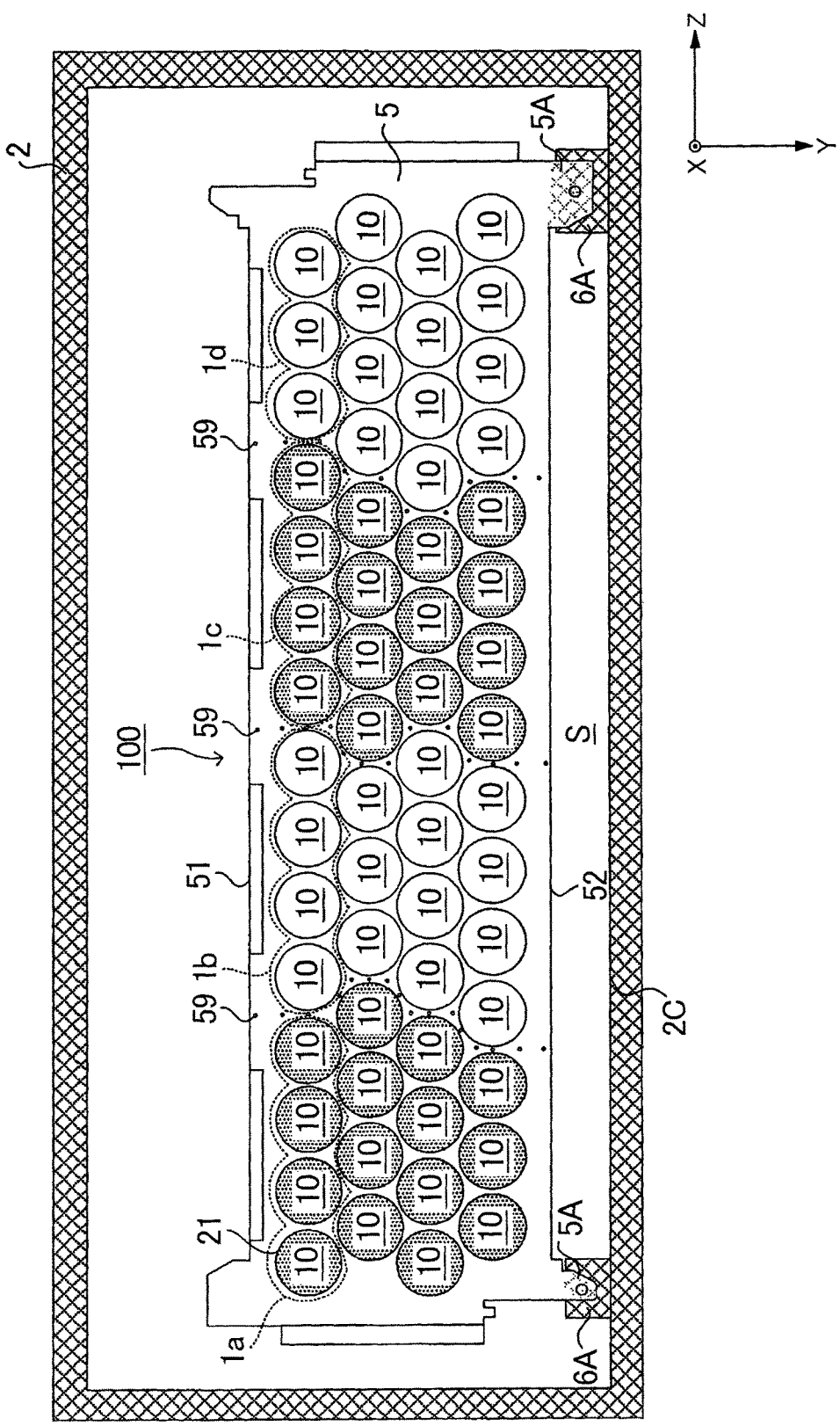
FIG. 6 is a sectional view of a holder plate.
Figure 7:
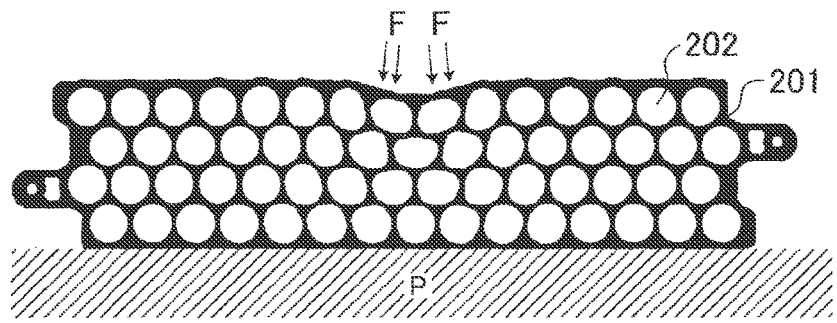
FIG. 7 is a view illustrating a behavior of a holder plate of which a side surface is entirely fixed to a fixing surface, at the time when a collision load is applied to the holder plate.

Referring now to FIG. 6, a modification of the vulnerable portion is described. FIG. 6 is a sectional view of a battery module according to the modification, and corresponds to FIG. 2. A holder plate 5 has a plurality of through holes 59 penetrating therethrough in the X-axis direction, and the through holes 59 are each formed along a boundary of adjacent battery groups. According to a configuration of the modification, a vulnerable portion having a low rigidity is formed along the boundary between the battery groups, thereby making it possible to break the holder plate 5 along the boundary between the adjacent battery groups, at the time of a vehicle collision. Further, as another modification, a vulnerable portion can be formed by forming a groove on that end surface of the holder plate 5 which includes the Y-Z plane, along a boundary between adjacent battery groups.

The invention claimed is:

1. A battery module provided in a vehicle, the battery module comprising:
 a battery set including cells, the cells extending in a first direction, each of the cells including electrode terminals on both end parts of each of the cells in the first direction, positive terminals of each of the cells being placed in a same plane perpendicular to the first direction, the battery set including at least a first battery group and a second battery group, and the first battery group being adjacent to the second battery group in a second direction perpendicular to the first direction;
 first bus bars provided in pair, the first bus bars being configured to connect, in parallel to each other, the electrode terminals of the cells included in the first battery group;
 second bus bars provided in pair, the second bus bars being configured to connect, in parallel to each other, the electrode terminals of the cells included in the second battery group;
 a holder plate; and
 a module case that accommodates the battery set, wherein the module case is distinct from the holder plate,
 wherein the holder plate includes:
  openings configured such that the cells are inserted in the openings respectively;
  a first end surface configured to receive a collision load of a collision object to collide from a third direction perpendicular to the first and second directions;
  a second end surface placed on an opposite side to the first end surface in the third direction of the holder plate;
  support portions provided on both end parts of the holder plate in the second direction, the support portions configured to support the holder plate, the holder plate being supported so as to define a space between the second end surface and an adjacent member in the third direction; and
  a vulnerable portion configured to break the holder plate along a boundary between the first battery group and the second battery group when the vulnerable portion receives the collision load.

2. The battery module according to claim 1, wherein the vulnerable portion includes:
 a first groove provided on the first end surface at a position corresponding to the boundary between the first battery group and the second battery group; and
 a second groove provided on the second end surface at a position corresponding to the boundary between the first battery group and the second battery group.

3. The battery module according to claim 2, wherein the first groove includes a first inclined surface,
 the first inclined surface is inclined relative to the third direction,
 the first inclined surface extends toward a first intermediate line,
 the first intermediate line is a line extending in the third direction so as to pass through an intermediate position between a first cell and a second cell in the second direction,
 the first cell is a cell placed at a position closest to the first groove among the cells included in the first battery group,
 the second cell is a cell placed at a position closest to the first groove among the cells included in the second battery group,
 the second groove includes a second inclined surface,
 the second inclined surface is inclined relative to the third direction,
 the second inclined surface extends toward a second intermediate line,
 the second intermediate line is a line extending in the third direction so as to pass through an intermediate position between a third cell and a fourth cell in the second direction,
 the third cell is a cell placed at a position closest to the second groove among the cells included in the first battery group, and
 the fourth cell is a cell placed at a position closest to the second groove among the cells included in the second battery group.

4. The battery module according to claim 1, wherein the first battery group and the second battery group are each configured such that cell rows are aligned in the third direction,
 each of the cell rows is a group in which the cells is aligned in the second direction,
 the first end surface includes curved surfaces projecting toward a direction opposite to the third direction,
 a cell center is placed on a first line,
 the first line is a line extending in the third direction so as to pass through a vertex of each of the curved surfaces, and
 the cell center is a center of each of fifth cells viewed in the first direction,
 the fifth cells are cells of the cell rows placed at a position closest to the first end surface among the first battery group and the second battery group.

5. The battery module according to claim 1, wherein the adjacent member is an inner surface of the module case.

* * * * *